US012772005B2

(12) United States Patent
Jiang et al.

(10) Patent No.: US 12,772,005 B2
(45) Date of Patent: Oct. 20, 2026

(54) COAXIAL SPEAKER PROTECTION METHOD, COAXIAL SPEAKER PROTECTION SYSTEM, COAXIAL SPEAKER PROTECTION DEVICE, AND COAXIAL SPEAKER PROTECTOR

(71) Applicant: AAC Technologies (Nanjing) Co., Ltd., Nanjing (CN)

(72) Inventors: Yuheng Jiang, Nanjing (CN); Lijian Ye, Nanjing (CN); Hongling Fu, Nanjing (CN); Ruizhi Lan, Nanjing (CN); Kejia Liu, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 282 days.

(21) Appl. No.: 18/399,713

(22) Filed: Dec. 29, 2023

(65) Prior Publication Data

US 2024/0340590 A1 Oct. 10, 2024

Related U.S. Application Data

(63) Continuation of application No. PCT/CN2023/086276, filed on Apr. 4, 2023.

(51) Int. Cl.

| | |
|---|---|
| ***H04R 9/02*** | (2006.01) |
| ***H04R 1/24*** | (2006.01) |
| ***H04R 3/00*** | (2006.01) |
| ***H04R 29/00*** | (2006.01) |

(52) U.S. Cl.

CPC ............ *H04R 9/022* (2013.01); *H04R 3/007* (2013.01); *H04R 29/003* (2013.01); *H04R 1/24* (2013.01)

(58) Field of Classification Search

CPC ...... H04R 9/022; H04R 3/007; H04R 29/003; H04R 1/24

See application file for complete search history.

(56) References Cited

U.S. PATENT DOCUMENTS

| | | | | |
|---|---|---|---|---|
| 11,159,888 | B1 * | 10/2021 | Zou | H04R 9/046 |
| 2013/0259245 | A1 * | 10/2013 | Cheng | H04R 3/00 381/58 |
| 2017/0164127 | A1 * | 6/2017 | Gautama | H04R 1/24 |
| 2021/0227323 | A1 * | 7/2021 | Kou | H03G 7/002 |

* cited by examiner

*Primary Examiner* — Mark Fischer

(74) *Attorney, Agent, or Firm* — Wiersch Law Group

(57) ABSTRACT

A coaxial speaker protection method, a coaxial speaker protection system, a coaxial speaker protection device, and a coaxial speaker protector are provided. The coaxial speaker protection method includes modeling a temperature of a tweeter to obtain a tweeter voltage-temperature transfer function, modeling a temperature and an amplitude of a woofer to obtain a woofer voltage-amplitude-temperature transfer function, modeling a coaxial device having the tweeter and the woofer to obtain a thermal conduction function of the coaxial device, calculating a current temperature of the tweeter according to a current voltage of the tweeter, predicting a temperature at a next moment of the woofer according to temperature information fed back by a current at a previous moment of the woofer, etc. A coaxial speaker is protected through the method.

5 Claims, 4 Drawing Sheets

COAXIAL SPEAKER PROTECTION METHOD, COAXIAL SPEAKER PROTECTION SYSTEM, COAXIAL SPEAKER PROTECTION DEVICE, AND COAXIAL SPEAKER PROTECTOR

TECHNICAL FIELD

The present disclosure relates to coaxial speakers, and in particular to a coaxial speaker protection method, a coaxial speaker protection system, a coaxial speaker protection device, and a coaxial speaker protector.

BACKGROUND

Coaxial speakers in the prior art each simultaneously drives a woofer and a tweeter through the same power amplifier, when the coaxial speakers signal with high loudness, high frequency, etc., temperatures of the coaxial speakers gradually increase, resulting in deviation of amplitudes, thereby causing abnormal situations, such as noise generation, etc., and the coaxial speakers are distorted.

Therefore, it is necessary to provide a coaxial speaker protection method, a coaxial speaker protection system, a coaxial speaker protection device, and a coaxial speaker protector.

SUMMARY

The present disclosure aims to provide a coaxial speaker protection method, a coaxial speaker protection system, a coaxial speaker protection device, and a coaxial speaker protector.

Technical solutions of the present disclosure are as follow.

The present disclosure provides a coaxial speaker protection method, including:

- modeling a temperature of a tweeter to obtain a tweeter voltage-temperature transfer function;
- modeling a temperature and an amplitude of a woofer to obtain a woofer voltage-amplitude-temperature transfer function;
- modeling a coaxial device having the tweeter and the woofer to obtain a thermal conduction function of the coaxial device;
- calculating a current temperature of the tweeter according to a current voltage of the tweeter;
- predicting a temperature at a next moment of the woofer according to temperature information fed back by a current at a previous moment of the woofer; and
- connecting the tweeter and the woofer in series, obtaining a target gain according to the current temperature of the tweeter, the temperature at the next moment of the woofer, an original audio signal, and a corresponding preset threshold, and processing the original audio signal according to the target gain.

In one embodiment, obtaining the woofer voltage-amplitude-temperature transfer function through connecting a woofer voltage-temperature transfer function and a woofer voltage-amplitude transfer function in series.

In one embodiment, obtaining the woofer voltage-temperature transfer function through performing calculation on a woofer thermal model function, I/V feedback data, and the thermal conduction function of the coaxial device.

In one embodiment, obtaining a voltage of the tweeter before modeling the temperature of the tweeter, the obtaining the voltage the tweeter includes modeling the voltage of a coaxial speaker to obtaining a coaxial speaker power amplifier total voltage-tweeter voltage transfer function, and performing calculation on the coaxial speaker power amplifier total voltage-tweeter voltage transfer function to obtain the voltage of the tweeter.

In one embodiment, obtaining the tweeter voltage-temperature transfer function through performing the calculation on a tweeter thermal model function and tweeter simulated power.

In a second aspect, the present disclosure provides a coaxial speaker protection system, applied to the coaxial speaker protection method as foregoing, the coaxial speaker protection system includes the woofer, the tweeter, a signal control module, and a thermal conduction module. The signal control module is configured to gain weights to signal gains of the woofer and the tweeter, and the thermal conduction module is configured to establish a thermal transfer model between the tweeter and the woofer.

In one embodiment, the woofer includes a woofer signal obtaining module, an I/V feedback module, a voice coil temperature calculation module, a woofer temperature control module, an amplitude module, and a woofer amplitude prediction module. The I/V feedback module is configured to feed back a voltage of the woofer, the voice coil temperature calculation module is configured to feed back a temperature of a woofer voice coil, the woofer temperature control module is configured to perform gain processing on the original audio signal through temperature gains, the amplitude module is configured to obtain a woofer voltage-amplitude transfer function, the woofer amplitude prediction module is configured to predict a woofer amplitude and is further configured to perform the gain processing on the original audio signal through amplitude gains. The tweeter includes a tweeter signal obtaining module, a temperature module, and a tweeter temperature control module. The temperature module is configured to obtain the tweeter voltage-temperature transfer function, the tweeter temperature control module is configured to predict the temperature of the tweeter and is further configured to perform gain processing on the original audio signal through temperature gains.

In a third aspect, the present disclosure provides a coaxial speaker protection device, applied to the coaxial speaker protection method as foregoing, the coaxial speaker protection device includes a main link and sub-links. The main link and the sub-links are connected in parallel. The main link includes a signal control module, an input end of the signal control module is configured to receive the original audio signal, and is further configured to connect to an output end of a woofer amplitude control module and an output end of a tweeter temperature control module. An output end of the signal control module is connected to the coaxial device, and an output end of each of the sub-links is connected to the input end of the signal control module. At least one of the sub-links includes a tweeter temperature calculation module, and remaining sub-links of the sub-links each includes a temperature module and a thermal conduction module connected in series; at least one of the sub-links includes a woofer temperature calculation module, and remaining sub-links of the sub-links each includes an I/V feedback module and a voice coil temperature calculation module connected in series; and at least one of the sub-links includes a woofer amplitude prediction module, and remaining sub-links of the sub-links each includes the I/V feedback module and an amplitude module connected in series.

In one embodiment, the tweeter temperature calculation module includes a tweeter thermal model function and a tweeter direct current (DC) resistance calculation module, the woofer temperature calculation module includes a woofer thermal model function and a woofer DC resistance calculation module.

In a fourth aspect, the present disclosure provides a coaxial speaker protector. An audio signal input end of the coaxial speaker protector is connected with at least one coaxial speaker protection device in series, the at least one coaxial speaker protection device is the speaker protection device as foregoing.

Beneficial effects of the present disclosure are as follow. The tweeter is protected through a feedforward manner, the woofer is protected through a feedback manner, and an original audio is adjusted to reduce power of a coaxial speaker, thereby reducing a temperature of the coaxial speaker, so that possibility that the coaxial speaker is distorted and generates noise is reduced.

DETAILED DESCRIPTION

The present disclosure is further described below with reference to accompanying drawings and embodiments.

Figure 1:
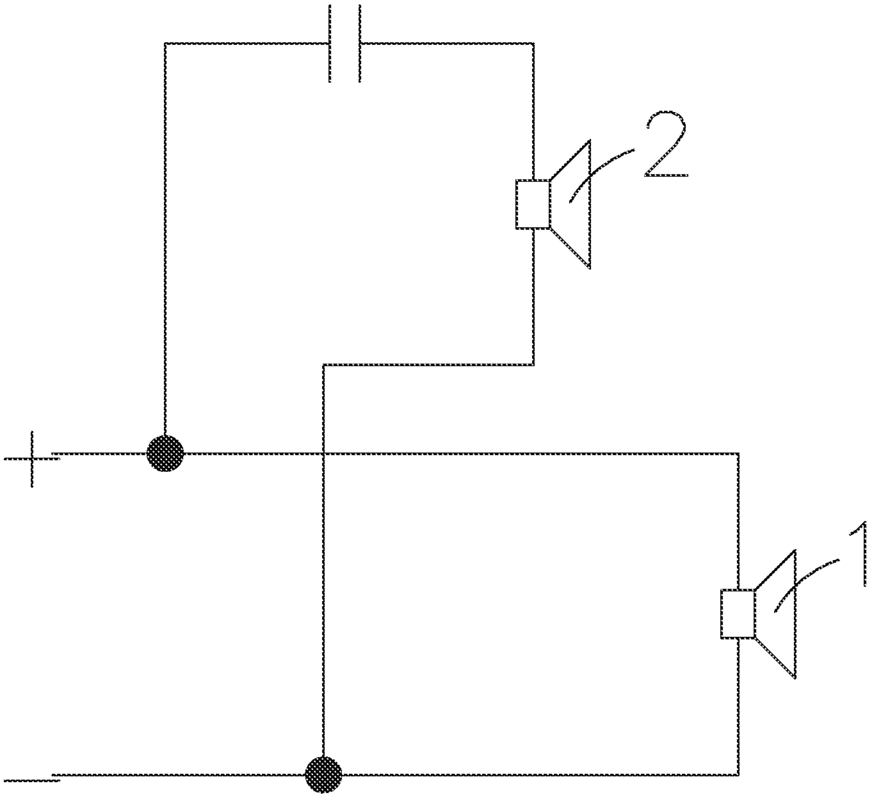
FIG. 1 is a schematic diagram of a coaxial speaker according to one embodiment of the present disclosure.

Embodiments of the present disclosure provide a coaxial speaker protection method, as shown in FIG. 1, a coaxial speaker is a speaker simultaneously driving a woofer 1 and a tweeter 2 through a single power amplifier (PA), and the coaxial speaker protection method includes following steps.

Modeling a temperature of a tweeter 2 to obtain a tweeter voltage-temperature transfer function, modeling a temperature and an amplitude of a woofer 1 to obtain a woofer voltage-amplitude-temperature transfer function, and modeling a coaxial device to obtain a thermal conduction function of the coaxial device, where the coaxial device is a two-in-one device having the tweeter 2 and the woofer 1; modeling according to the coaxial device having the tweeter 2 and the woofer 1, calculating a current temperature of the tweeter 2 according to a current voltage of the tweeter 2, performing feedforward on the current temperature of the tweeter 2; predicting a temperature at a next moment of the woofer 1 according to temperature information fed back by a current at a previous moment of the woofer 1 to feed back temperature information of the woofer 1; connecting an output end of the tweeter 2 and an input end of the woofer 1 to connect the tweeter 2 and the woofer 1 in series; obtaining a target gain according to an original audio signal and a corresponding preset threshold, and processing the original audio signal according to the target gain, where the corresponding preset threshold is a maximum temperature value of the coaxial speaker, and the target gain is a gain expected to be obtained, for example, when the corresponding preset threshold of the coaxial speaker is 100 degrees and the temperature of the coaxial speaker is predicted to reach 200 degrees, 70% of the original audio signal needs to be compressed for performing, and the target gain is 70%.

According to the coaxial speaker protection method, through monitoring a current of the woofer 1, the woofer 1 is protected through a feedback manner, the tweeter 2 is protected through a feedforward manner, and an original audio is adjusted according to the target gain to reduce a load of the coaxial speaker, thereby reducing possibility that the temperature of the coaxial speaker is too high, so that the coaxial speaker is protected to avoid from generating noise, moreover, possibility that the coaxial speaker is distorted is reduced.

In one embodiment, the woofer voltage-amplitude-temperature transfer function is an overall transfer function of the woofer 1, the overall transfer function of the woofer 1 is obtained through connecting a woofer voltage-temperature transfer function and a woofer voltage-amplitude transfer function in series.

Data of the woofer 1 are integrated through a corresponding algorithm to obtain the woofer voltage-amplitude-temperature transfer function, so that the woofer 1 is better protected in a feedback manner.

In one embodiment, the woofer voltage-temperature transfer function is obtained through performing calculation on a woofer thermal model function, I/V feedback data, and the thermal conduction function of the coaxial device.

The woofer voltage-temperature transfer function is obtained through performing the calculation on corresponding data, thereby facilitating a protection of the woofer 1.

In one embodiment, obtaining a voltage of the tweeter 2 before modeling the temperature of the tweeter 2, the obtaining the voltage the tweeter 2 includes modeling the voltage of a coaxial speaker to obtaining a coaxial speaker power amplifier total voltage-tweeter voltage transfer function, and performing calculation on the coaxial speaker power amplifier total voltage-tweeter voltage transfer function to obtain the voltage of the tweeter 2. In particular, an obtaining method of the coaxial speaker power amplifier total voltage-tweeter voltage transfer function includes, but is not limited to, a least square fit, a Kirchhoff mod method, a state equation, etc.

Data of the tweeter 2 are integrated through a corresponding algorithm to obtain the tweeter voltage-temperature transfer function, so that the tweeter 2 is better protected in a feedforward manner.

In one embodiment, the tweeter voltage-temperature transfer function is obtained through performing calculation on a tweeter thermal model function and tweeter simulated power.

The tweeter voltage-temperature transfer function is obtained through such manner.

Figure 2:
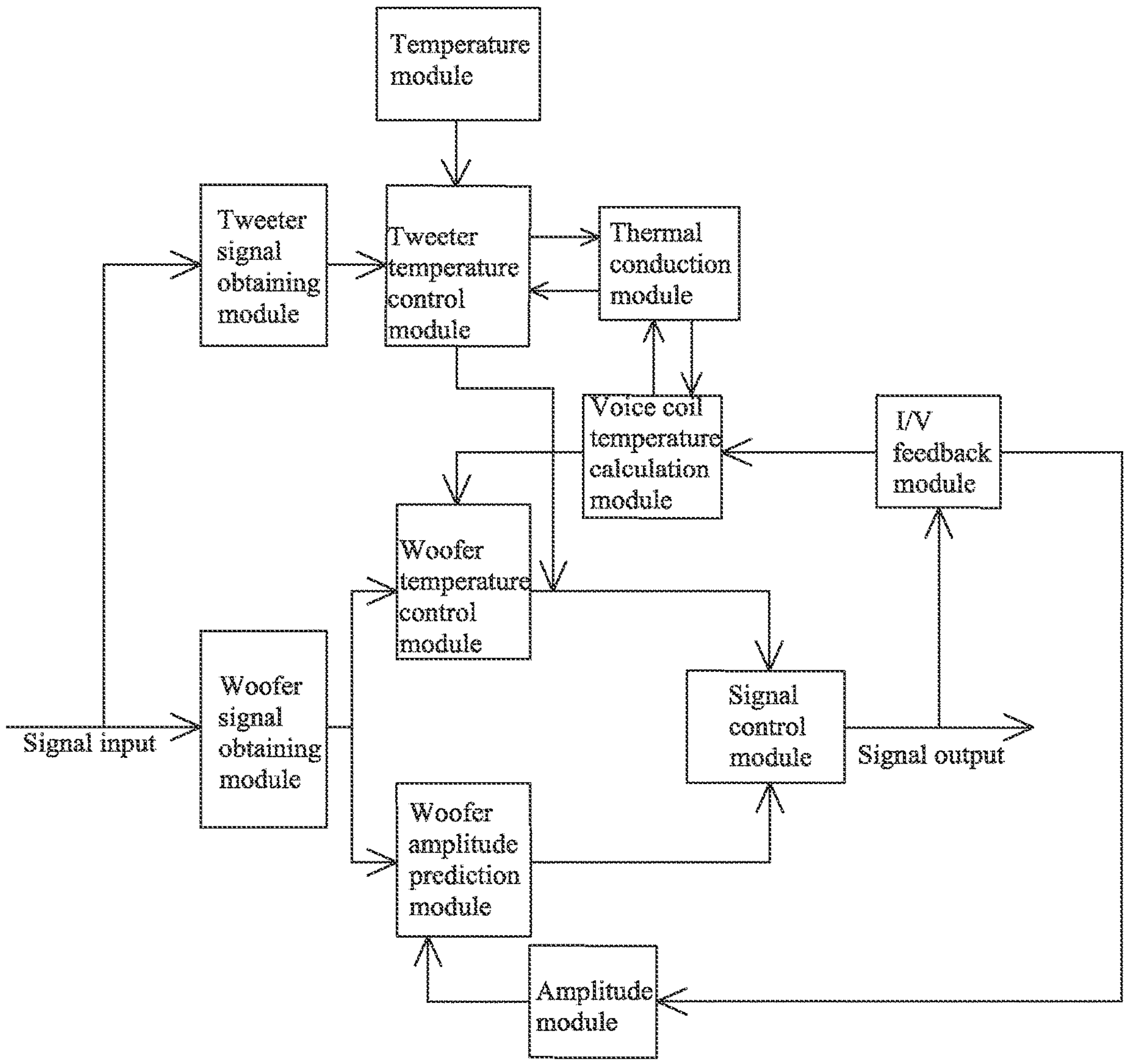
FIG. 2 is a schematic diagram of a coaxial speaker protection system according to one embodiment of the present disclosure.

As shown in FIG. 2, the present disclosure further provides a coaxial speaker protection system, applied to the coaxial speaker protection method as foregoing. The coaxial speaker protection system includes the woofer 1, the tweeter 2, a signal control module, and a thermal conduction module. The thermal conduction module is configured to establish a thermal transfer model between the tweeter 2 and the woofer 1, and the signal control module is configured to gain weights to signal gains of the woofer 1 and the tweeter 2.

The thermal transfer model between the tweeter 2 and the woofer 1 is established through the thermal conduction module to obtain a thermal conductivity coefficient of the coaxial device, so that the coaxial speaker is better protected. The signal control module dynamically adjusts gains of the woofer 1 and the tweeter 2 through a corresponding algorithm, so as to better protect the coaxial speaker and achieve a purpose of improving sound quality of the coaxial speaker.

As shown in FIG. 2, in one embodiment, the woofer 1 includes a woofer signal obtaining module, an I/V feedback module, a voice coil temperature calculation module, a woofer temperature control module, an amplitude module, and a woofer amplitude prediction module. The woofer signal obtaining module obtains a woofer signal through signal fusion. Signal fusion refers to that two signals need to be synthesized when the woofer 1 and the tweeter 2 play different audios and have different frequency bands and the single PA drives the woofer 1 and the tweeter 2 at the same time. The I/V feedback module is configured to feed back a voltage of the woofer 1, the voice coil temperature calculation module is configured to feed back a temperature of a woofer voice coil, the woofer temperature control module is configured to perform gain processing on the original audio signal through temperature gains. The amplitude module is configured to obtain the woofer voltage-amplitude transfer function. The woofer amplitude prediction module is configured to predict a woofer amplitude, and is further configured to perform the gain processing on the original audio signal through amplitude gains.

The tweeter 2 includes a tweeter signal obtaining module, a temperature module, and a tweeter temperature control module. The tweeter signal obtaining module is configured to obtain a tweeter signal through the signal fusion. The temperature module is configured to obtain the tweeter voltage-temperature transfer function, the tweeter temperature control module is configured to predict the temperature of the tweeter 2 and is further configured to perform gain processing on the original audio signal through temperature gains.

The coaxial speaker is protected by the coaxial speaker protection system, so that possibility that the coaxial speaker generates noise, the coaxial speaker is distorted, etc. is reduced, and the sound quality of the coaxial speaker is further improved.

The present disclosure further provides a coaxial speaker protection device, the coaxial speaker protection device includes a main link and sub-links. The main link and the sub-links are connected in parallel. The main link includes a signal control module, an input end of the signal control module is configured to receive the original audio signal, and is further configured to connect to an output end of a woofer amplitude control module and an output end of the tweeter temperature control module for facilitating receiving corresponding signals. An output end of the signal control module is connected to the coaxial device, that is, the output end of the signal control module is connected to the coaxial speaker, and an output end of each of the sub-links is connected to the input end of the signal control module.

Figure 3:
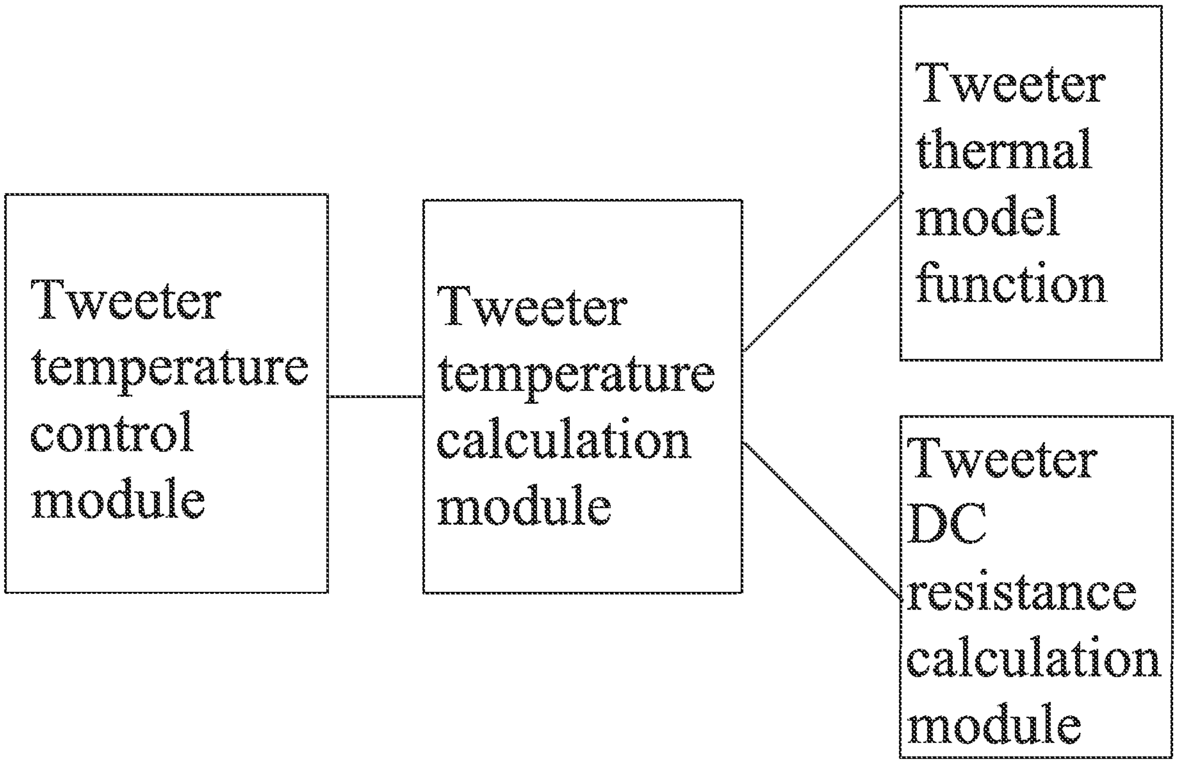
FIG. 3 is a schematic diagram of a tweeter temperature control module according to one embodiment of the present disclosure.

At least one of the sub-links includes a tweeter temperature calculation module, as shown in FIG. 3, the tweeter temperature calculation module is included in the tweeter temperature control module, and remaining sub-links of the sub-links each includes the temperature module and the thermal conduction module connected in series.

Figure 4:
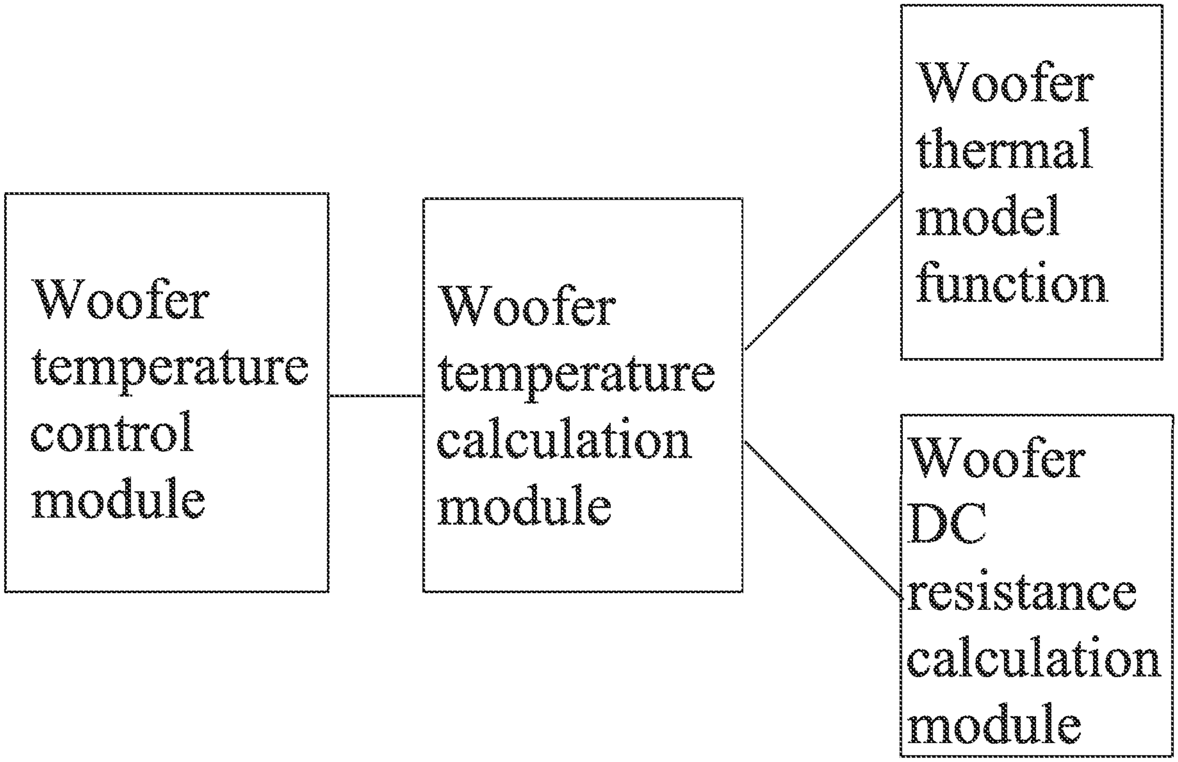
FIG. 4 is a schematic diagram of a woofer temperature control module according to one embodiment of the present disclosure Reference numerals in the drawings: 1. woofer; 2. tweeter.

At least one of the sub-links includes a woofer temperature calculation module, as shown in FIG. 4, the woofer temperature calculation module is included in the woofer temperature control module, and remaining sub-links of the sub-links each includes the I/V feedback module and the voice coil temperature calculation module connected in series.

At least one of the sub-links includes a woofer amplitude prediction module, and remaining sub-links of the sub-links each includes the I/V feedback module and the amplitude module connected in series.

In one embodiment, the tweeter temperature calculation module includes the tweeter thermal model function and a tweeter direct current (DC) resistance calculation module, the woofer temperature calculation module includes the woofer thermal model function and a woofer DC resistance calculation module. The woofer thermal model function and the woofer DC resistance calculation module work together to improve accuracy of temperature calculation, so that the coaxial speaker is better protected.

The present disclosure further provides a coaxial speaker protector, the coaxial speaker protector is a combination device having a stable amplitude protection function. An audio signal input end of the coaxial speaker protector is connected with at least one coaxial speaker protection device in series, the at least one coaxial speaker protection device is the speaker protection device as foregoing.

The present disclosure provides the coaxial speaker protection method, the coaxial speaker protection system, the coaxial speaker protection device, and the coaxial speaker protector. The coaxial speaker protection method includes modeling the temperature of the tweeter 2 to obtain the tweeter voltage-temperature transfer function; modeling the temperature and the amplitude of the woofer 1 to obtain the woofer voltage-amplitude-temperature transfer function; modeling the coaxial device having the tweeter 2 and the woofer 1 to obtain the thermal conduction function of the coaxial device; calculating the current temperature of the tweeter 2 according to the current voltage of the tweeter 2; predicting the temperature at the next moment of the woofer 1 according to temperature information fed back by the current at the previous moment of the woofer 1; connecting the tweeter 2 and the woofer 1 in series, obtaining the target gain according to the current temperature of the tweeter 2, the temperature at the next moment of the woofer, the original audio signal, and the corresponding preset threshold, and processing the original audio signal according to the target gain. According to the present disclosure, the tweeter 2 is protected through a feedforward manner, the woofer 1 is protected through a feedback manner, which improves the sound quality of the coaxial speaker, reduces the possibility that the coaxial speaker generates noise and the coaxial speaker is distorted, and better meets actual requirements of users.

The foregoing are merely embodiments of the present disclosure, and it should be noted that, for those who skilled in the art, improvements may be made without departing from concepts of the present disclosure, but these are all within the protection scope of the present disclosure.

What is claimed is:

1. A coaxial speaker protection method, comprising:

modeling a temperature of a tweeter to obtain a tweeter voltage-temperature transfer function;

modeling a temperature and an amplitude of a woofer to obtain a woofer voltage-amplitude-temperature transfer function;

modeling a coaxial device having the tweeter and the woofer to obtain a thermal conduction function of the coaxial device;

calculating a current temperature of the tweeter according to a current voltage of the tweeter;

predicting a temperature at a next moment of the woofer according to temperature information fed back by a current at a previous moment of the woofer; and connecting the tweeter and the woofer in series, obtaining a target gain according to the current temperature of the tweeter, the temperature at the next moment of the woofer, an original audio signal, and a corresponding preset threshold, and processing the original audio signal according to the target gain.

2. The coaxial speaker protection method according to claim 1, wherein obtaining the woofer voltage-amplitude-temperature transfer function through connecting a woofer voltage-temperature transfer function and a woofer voltage-amplitude transfer function in series.

3. The coaxial speaker protection method according to claim 2, wherein obtaining the woofer voltage-temperature transfer function through performing calculation on a woofer thermal model function, I/V feedback data, and the thermal conduction function of the coaxial device.

4. The coaxial speaker protection method according to claim 1, wherein obtaining a voltage of the tweeter before modeling the temperature of the tweeter, the obtaining the voltage the tweeter comprises:

modeling the voltage of a coaxial speaker to obtaining a coaxial speaker power amplifier total voltage-tweeter voltage transfer function, and performing calculation on the coaxial speaker power amplifier total voltage-tweeter voltage transfer function to obtain the voltage of the tweeter.

5. The coaxial speaker protection method according to claim 1, wherein obtaining the tweeter voltage-temperature transfer function through performing the calculation on a tweeter thermal model function and tweeter simulated power.

* * * * *